United States Patent Office 3,838,120
Patented Sept. 24, 1974

3,838,120
1-ALKYL - 1H,4H - PYRIDO[2,3-d][1,3]OXAZINE-2,4-DIONES AND THEIR CONVERSION TO 1-ALKYL-1,4-DIHYDRO-4-OXO - 1,8 - NAPHTHYRIDINE-3-CARBOXYLIC ACIDS
Andrew W. Zalay, Albany, and Malcolm R. Bell, East Greenbush, N.Y., assignors to Sterling Drug Inc., New York, N.Y.
No Drawing. Continuation-in-part of abandoned application Ser. No. 312,825, Dec. 7, 1972. This application Mar. 29, 1973, Ser. No. 346,191
Int. Cl. C07d 31/36, 87/20
U.S. Cl. 260—244 R                 9 Claims

ABSTRACT OF THE DISCLOSURE

1-$R_1$-7-Q - 1H,4H - pyrido[2,3-d][1,3]oxazine - 2,4-dione (I) where $R_1$ is lower-alkyl and Q is lower-alkyl, lower-alkanoyloxymethyl, 4(or 3)-pyridyl or 4(or 3)-pyridyl having one or two lower-alkyl substituents; the preparation of I by heating 2-$R_1$NH-6-Q"-nicotinic acid (V) with a lower-alkyl chloroformate or phosgene to prepare I where Q is Q", which is like Q but excluding lower-alkanoyloxymethyl, or by converting I where Q is $CH_3$ to its 8-oxide and reacting the oxide with a lower-alkanoic acid anhydride to produce I where Q is lower-alkanoyloxymethyl; the conversion of I to lower-alkyl 1-$R_1$-2-$R_2$ - 1,4 - dihydro - 4 - oxo-7-Q-1,8-naphthyridine-3-carboxylate (III) by reacting I with $$R_2-C(=O)CH_2COOR,$$

where $R_2$ is H or $CH_3$ and R is lower-alkyl; and, the hydrolysis of III to produce 1-$R_1$-2-$R_2$-1,4-dihydro-4-oxo-7-Q' - 1,8 - naphthyridine - 3 - carboxylic acid (IV), where Q' is like Q but having hydroxymethyl instead of lower-alkanoyloxymethyl. Also shown are: the hydrolysis of 1,2-dihydro-2-oxo-6-Q'''-nicotinonitrile (VII), where Q''' is 4(or 3)-pyridyl or 4(or 3)-pyridyl having one or two lower-alkyl substituents, to produce 1,2-dihydro-2-oxo-6-Q'''-nicotinic acid (VIII); the halogenation of VIII to produce 2-halo-6-Q'''-nicotinic acid (VI'); and, the reaction of VI' with $R_1NH_2$ to produce 2-$R_1$NH-6-Q'''-nicotinic acid.

---

This application is a continuation-in-part of copending application Ser. No. 312,825, filed Dec. 7, 1972 and now abandoned.

This invention relates to a process for producing 4-oxo-1,8 - naphthyridine - 3 - carboxylic acid derivatives and to intermediates used therein.

The invention provides a novel process which comprises reacting 1-$R_1$-7-Q - 1H,4H - pyrido[2,3-d][1,3]oxazine-2,4-dione of formula I

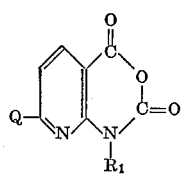

with a compound of formula II

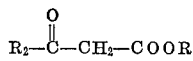

$$R_2-\overset{O}{\overset{\|}{C}}-CH_2-COOR \qquad II$$

where Q is lower-alkyl, lower-alkanoyloxymethyl, 4(or 3)-pyridyl or 4(or 3)-pyridyl having one or two lower-alkyl substituents, $R_1$ and R are each lower-alkyl and $R_2$ is H or $CH_3$, to produce lower-alkyl 1-$R_1$ - 1,4 - dihydro-2-$R_2$-4 - oxo - 7 - Q - 1,8 - naphthyridine - 3 - carboxylate of formula III

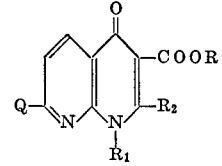

where Q, R, $R_1$ and $R_2$ are defined as above for formulas I and II, and hydrolyzing III to obtain the corresponding 3-carboxylic acid of formula IV

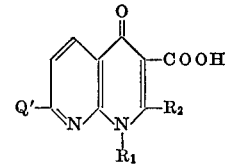

where Q' is lower-alkyl, hydroxymethyl, 4(or 3)-pyridyl or 4(or 3)-pyridyl having one or two lower-alkyl substituents, $R_1$ is lower-alkyl and $R_2$ is H or $CH_3$. The compounds of formula IV are disclosed and claimed in U.S. Pat. 3,590,036, issued June 29, 1971. Perhaps best known because of their high antibacterial activity are nalidixic acid (IV where Q' is $CH_3$, $R_1$ is $C_2H_5$ and $R_2$ is H) and hydroxynalidixic acid (IV where Q' is $HOCH_2$, $R_1$ is $C_2H_5$ and $R_2$ is H).

Other aspects of the invention reside in the intermediate 1-(lower-alkyl)-7-Q - 1H,4H - pyrido[2,3-d][1,3]oxazine-2,4-dione of formula I; in the process for its preparation where Q is Q" or as defined for formula I but excluding lower-alkanoyloxymethyl which comprises heating 2-$R_1$NH-6-Q"-nicotinic acid of formula V

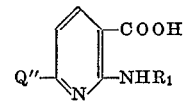

with a lower-alkyl chloroformate or phosgene, where $R_1$ is defined as in formula I and Q" is lower-alkyl, 4(or 3)-pyridyl or 4(or 3)-pyridyl having one or two lower-alkyl substituents, which, in turn, are prepared by reacting the corresponding 2 - halo-6-Q"-nicotinic acid (VI) with a lower-alkylamine of the formula $R_1NH_2$; and in the process for the preparation of I where Q is lower-alkanoyloxymethyl which comprises reacting 1-$R_1$-7-methyl - 1H,4H - pyrido[2,3-d][1,3]oxazine-2,3-dione (I where Q is methyl) with an oxidizing agent capable of converting pyridines to pyridine-N-oxides to produce 1-$R_1$-7 - methyl - 1H,4H - pyrido[2,3-d][1,3]oxazine-2,4-dione-8-oxide and then reacting said 8-oxide with a lower-alkanoic acid anhydride to produce I where Q is lower-alkanoyloxymethyl.

Disclosed and claimed in the copending Brundage and Lesher application Ser. No. 346,190, filed (even date herewith), is the intermediate 2-$R_1$NH-6-Q'''-nicotinic acid of formula V'

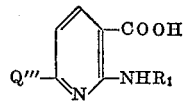

where $R_1$ is lower-alkyl and Q''' is 4(or 3)-pyridyl or 4(or 3)-pyridyl having one or two lower-alkyl substituents, and in the process of its preparation which comprises the combination of the three steps of hydrolyzing 1,2-dihydro - 2 - oxo-6-Q'''-nicotinonitrile (VII) to produce 1,2-dihydro-2-oxo-6-Q'''-nicotinic acid (VIII), halogenating VIII to produce 2-halo-6-Q'''-nicotinic acid (VI')
and reacting VI' with a lower-alkylamine of the formula
$R_1NH_2$ to produce V'. In addition to said combination
of the three steps, other process aspects of the invention
are each individual step and the two combinations of two
consecutive steps.

Also disclosed and claimed in said copending application Ser. No. 346,180 are the compounds: 1,2-dihydro-2-oxo-6-Q'''-nicotinic acid and its tautomeric 2-hydroxy-6-Q'''-nicotinic acid of the respective formulas VIII and VIIIA

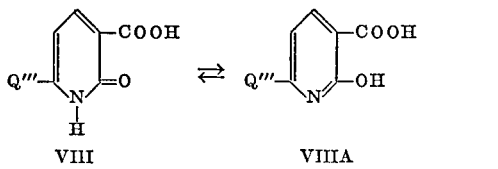

and, also, 2-halo-6-Q'''-nicotinic acid of the formula VI'

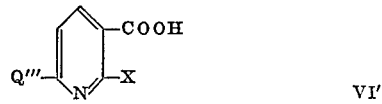

where Q''' has the meaning designated hereinabove for
formula V' and X is halo, preferably chloro or bromo.

Because of the ready availability and/or low cost of
intermediates and/or because of high antibacterial activity of the final products (III or IV), preferred process
and composition embodiments of the various aspects of
the inventions herein disclosed are those where $R_1$ is
ethyl, $R_2$ is hydrogen, halo is chloro, Q is methyl, acetoxymethyl, 4(or 3)-pyridyl, 2-methyl-4-pyridyl or 2,6-dimethyl-4-pyridyl, Q' is as Q and also hydroxymethyl,
Q" is as Q but excluding acetoxymethyl, and Q''' is 4(or
3)-pyridyl, 2-methyl-4-pyridyl or 2,6-dimethyl-4-pyridyl.

The term "lower-alkyl," as used herein, e.g., as represented by $R_1$ in formula I, III or IV or as a substituent
of 4(or 3)-pyridyl when represented by Q in formula I
or III or by Q' in formula IV, means alkyl radicals having from one to six carbon atoms which can be arranged
as straight or branched chains, illustrated by methyl,
ethyl, n-propyl, isopropyl, n-butyl, sec-butyl, isobutyl,
n-amyl, n-hexyl, and the like.

The term "lower-alkanoyl," as used herein, e.g., in the
definition of the Q substituent as lower-alkanoyloxymethyl in formula I or III, means alkanoyl radicals having from one to six carbon atoms, including the straight-and branched-chain radicals, illustrated by formyl, acetyl,
propionyl (propanoyl), butyryl (butanoyl), isobutyryl
(2-methylpropanoyl) and caproyl (hexanoyl).

Illustrative of the Q substituent in formula I or III or
of the Q' substituent in formula IV or of the Q" substituent in formula V or of the Q''' substituent in formula
V', VI', VII, VIII or VIIIA where Q or Q' or Q" or Q''',
respectively, is 4(or 3)-pyridyl having one or two lower-alkyl substituents are the following: 2-methyl-4-pyridyl,
2,6-dimethyl-4-pyridyl, 3-methyl-4-pyridyl, 2-methyl - 3-pyridyl, 6-methyl-3-pyridyl (preferably named 2-methyl-5-pyridyl), 2,3-dimethyl - 5 - pyridyl, 2,5 - dimethyl-4-pyridyl, 2-ethyl-4-pyridyl, 2-isopropyl - 4 - pyridyl, 2-n-butyl-4-pyridyl, 2-n-hexyl-4-pyridyl, 2,6-diethyl-4-pyridyl,
2,6-diethyl-3-pyridyl, 2,6-diisopropyl-4-pyridyl, 2,6-di-n-hexyl-4-pyridyl, and the like.

As shown above, 1,2 - dihydro - 2 - oxo-6-Q'''-nicotinic
acid of formula VIII is tautomeric with 2-hydroxy-6-Q'''-nicotinic acid of formula VIIIA. As with all tautomeric
systems, the rate of the transformation VIII⇌VIIIA and
the ratio VIII/VIIIA are dependent on the thermo-dynamic environment, including the state of aggregation;
so that measurements by any particular techniques do not
necessarily have validity except under the conditions of
the measurement, thereby, among other consequences,
giving rise to problems for any simple designation of the physical embodiments. Thus, measurements of the infrared spectra, in potassium bromide admixture, or in
chloroform or mineral oil, indicate existence predominantly as VIII and the names of the compounds
herein therefore are preferably based on structure VIII,
although it is understood that either or both structures
are comprehended.

The intermediate 2-(lower-alkylamino) - 6 - (lower-alkyl)-nicotinic acid (V where Q" is lower-alkyl) is prepared by halogenating the generally known 1,2-dihydro-2-oxo-6-(lower-alkyl)nicotinic acid with a halogenating
agent, preferably a chlorinating agent, e.g., $PCl_3$, $PCl_5$,
$POCl_3$, $SO_2Cl_2$, and the like, to produce 2-halo-6-(lower-alkyl)-nicotinic acid and then reacting said 2-halo acid
with a lower-alkylamine ($R_1NH_2$).

The generally known intermediate 1,2-dihydro-2-oxo-6-Q'''-nicotinonitrile (VII) or tautomer (VIIA) is prepared by the known procedure of first reacting 4(or 3)-acetylpyridine or 4(or 3)-acetylpyridine substituted on
the pyridine ring by one or two lower-alkyl substituents,
as represented by Q'''-$COCH_3$, with ethyl formate and
sodium methoxide to yield the sodium salt of Q'''-$COCH_2CHO$, e.g., the sodium salt of isonicotinoylacetaldehyde where Q''' is 4-pyridyl, and then reacting said
sodium salt with cyanoacetamide in aqueous medium to
produce said 1,2-dihydro-2-oxo-6 - Q''' - nicotinonitrile,
e.g., where Q''' is 4-pyridyl, also named 1,6-dihydro-6-oxo[2,4'-bipyridine]-5-carbonitrile.

The molecular structures of said intermediate aspects
(I, V', VI, VIII and VIIIA) of the inventions herein
disclosed and of the final products (III and IV) are
assigned on the basis of evidence provided by infrared,
ultraviolet and nuclear magnetic resonance spectra, and
by the correspondence of calculated and found values
for the elementary analysis for representative examples.

The manner of making and using the instant invention will now be generally described so as to enable a
person skilled in the art of pharmaceutical chemistry to
make and use the same, as follows:

The hydrolysis of 1,2-dihydro-2-oxo-6-Q'''-nicotinonitrile (VII) or its tautomer (VIIA) to produce the corresponding 1,2-dihydro-2-oxo-6-Q'''-nicotinic acid is preferably carried out by refluxing VII (or VIIA) in an aqueous acidic medium, preferably using from about 1:2 to
1:1 parts by volume of concentrated (95–97%) sulfuric
acid and water, respectively. Other aqueous acidic media
can be used, e.g., 6N hydrochloric acid, and the like.

The reaction of 1,2-dihydro-2-oxo - 6 - (lower - alkyl)-nicotinic acid (VIII) or 2-hydroxy-6-Q'''-nicotinic acid
(VIIIA) with a halogenating agent, preferably a mixture
of phosphorus oxychloride and phosphorus pentachloride,
is carried out by heating the reactants, preferably at
about 50–110° C. The reaction is conveniently run by
refluxing the reactants in chloroform; however, the reaction can be run in the absence of a solvent or using
another inert solvent, e.g., benzene, toluene, xylene,
chlorobenzene, methylene dichloride, and the like. Also,
other chlorinating agents can be used, e.g., phosphorous
oxychloride or phosphorus pentachloride alone, phosphorus trichloride, thionyl chloride, phosgene, phenyl-phosphonic dichloride, and the like.

The reaction of 2-halo-6-Q" (or Q''') -nicotinic acid
(VI or VI') with a lower-alkylamine, $R_1$-$NH_2$, to produce
2-$R_1$NH-6-Q" (or Q''')-nicotinic acid (V or V') is conveniently carried out by heating the reactants together in a
stainless steel autoclave. The reaction temperature is about
75–150° C., preferably about 90–110° C. Alternatively, a
suitable inert solvent can be used, e.g., ethanol, toluene,
xylene, benzene, and the like.

The reaction of 2-$R_1$NH-6-Q"-nicotinic acid (V) with
a lower-alkyl chloroformate to produce 1-$R_1$-7-Q"-1H,4H-pyrido[2,3-d][1,3]oxazine-2,4-dione is carried out by heating the reactants at about 125–175° C., preferably about
135–150° C. in the absence or presence of an inert solvent, e.g., xylene. Alternatively, phosgene can be used in place of the lower-alkyl chloroformate.

The reaction of 1-$R_1$-7-methyl-1H,4H-pyrido[2,3-d][1,3]oxazine-2,3-dione (I where Q is methyl) with an oxidizing agent to produce 1-$R_1$-7-methyl-1H,4H-pyrido[2,3-d][1,3]oxzine-2,4-dione-8-oxide is carried out by reacting I where Q is methyl with an oxidizing agent capable of converting pyridines to pyridine-N-oxides, preferably with a per acid, e.g., peracetic acid, perbenzoic acid, 3-chloroperbenzoic acid, and the like, or with other oxidizing agents, e.g., hydrogen peroxide, in the presence of a suitable solvent inert under the reaction conditions, e.g., acetic acid, chloroform, and the like. The reaction is conveniently run by mixing the reactants carefully at room temperature (about 20–25° C.) up to about 40–50° C., preferably with stirring, and then heating the reaction mixture on a steam bath to ensure completion of the reaction.

The conversion of 1-$R_1$-7-methyl-1H,4H-pyrido[2,3-d][1,3]oxazine-2,3-dione-8-oxide to 1-$R_1$-7-(lower-alkanoyloxymethyl)-1H,4H-pyrido[2,3-d][1,3]oxazine-2,3-dione is carried out by reacting said 8-oxide with a lower-alkanoic acid anhydride. The reaction is conveniently run using as solvent an excess of the anhydride or the corresponding alkanoic acid, e.g., acetic acid with acetic anhydride, or any suitable solvent unreactive to said anhydrides, e.g., acetonitrile, benzene, toluene, dimethylformamide, and the like. The reaction is generally carried out in the range of about 70–150° C., preferably on a steam bath.

The reaction of 1-$R_1$-7-Q-1H,4H-pyrido[2,3-d][1,3]oxazine-2,4-dione (I) with a lower-alkyl acetoacetate (II, $R_2$=$CH_3$) or formylacetate (II, $R_2$=H), the latter preferably as its alkali metal enolate, to produce a lower-alkyl 1-$R_1$-1,4-dihydro-4-oxo-2-$R_2$-7-Q-1,8 - naphthyridine - 3-carboxylate (III) is carried out by heating the reactants in the range of about 50–150° C., preferably about 80–120° C., preferably using an inert solvent, e.g., dimethylformamide. Alternatively, the lower-alkyl formylacetate can be prepared *in situ* from a lower-alkyl ether or lower-alkanoate (1–6 carbon atoms) of its enol form, preferably its methyl or ethyl ether or its acetate.

The hydrolysis of lower-alkyl 1-$R_1$-1,4-dihydro-4-oxo-2-$R_2$-7-Q-1,8-naphthyridine-3-carboxylate (III) to produce 1-$R_1$-1,4-dihydro-4-oxo-2-$R_2$-7-Q'-1,8 - naphthyridine - 3-carboxylic acid (IV) is run either under acidic or alkaline conditions. The hydrolysis can be carried out from about room temperature (25° C.) to about 100° C. using, where necessary, an appropriate solvent, e.g., water, ethanol, methanol, acetone, and the like. Various acidic or alkaline solutions can be used, e.g., aqueous hydrochloric acid, hydrobromic acid, sulfuric acid, sodium hydroxide, potassium hydroxide, calcium hydroxide, and the like.

The best mode contemplated for carrying out the invention is now set forth as follows:

Example 1

2-Chloro-6-methylnicotinic acid.—To a mixture of 75 ml. of phosphorus oxychloride, 340 g. of finely ground phosphorus pentachloride and 800 ml. of chloroform was added 123 g. of well ground powdered 1,2-dihydro-6-methyl-2-oxonicotinic acid whereupon a slightly exothermic reaction ensued. This reaction mixture was heated to boiling over a period of one hour and then was refluxed for eight and one-half hours. The reaction mixture was next concentrated *in vacuo* and then concentrated *in vacuo* at 0.5 mm. after diluting it with methylene dichloride. The resulting residual brown oil containing some solid was poured into 800 ml. of ice water and the resulting mixture stirred at room temperature for three hours. A brown granular precipitate was filtered off and washed with three 60 ml. portions of water. The combined aqueous filtrate and washings were extracted with two 500 ml. portions of chloroform. Said brown granular precipitate was extracted with the same chloroform and then extracted with a third 500 ml. portion of boiling chloroform. The combined chloroform extracts were washed with water, dried over anhydrous magnesium sulfate, treated with decolorizing charcoal, filtered and concentrated *in vacuo* to remove the solvent. The crystalline residue was recrystallized from ethyl acetate and dried *in vacuo* at 60° C. for two hours to yield a first crop of 44 g., m.p. 142–149° C., and a second crop of 20 g., m.p. 138–143° C. Recrystallization of these two crops plus 7 g. of product obtained by another run from 300 ml. of ethyl acetate gave 41.4 g. of 2-chloro-6-methylnicotinic acid, m.p. 150–151° C. Also obtained was a second crop of 9.3 g., m.p. 141–147° C. Using molar equivalent quantities of pohsphorus oxybromide and phosphorus pentabromide in place of phosphorus oxychloride and phosphorus pentachloride, respectively, 2-bromo-6-methylnicotinic acid is obtained.

Following the procedure described above in Example 1 but using in place of 1,2-dihydro-6-methyl-2-oxonicotinic acid a molar equivalent quantity of the appropriate corresponding 1,2-dihydro-6-(lower-alkyl)-2 - oxonicotinic acid, there are obtained the following 2-chloro-6-(lower-alkyl)nicotinic acids: 2-chloro-6-ethylnicotinic acid using 6-ethyl-1,2-dihydro-2-oxonicotinic acid; 2-chloro-6-isopropylnicotinic acid using 1,2-dihydro-6-isopropyl-2-oxonicotinic acid; 6-n-butyl-2-chloronicotinic acid using 6-n-butyl-1,2-dihydro-2-oxonicotinic acid; and 2-chloro-6-n-hexylnicotinic acid using 6-n-hexyl-1,2-dihydro-2-oxonicotinic acid.

Example 2

2-Ethylamino-6-methylnicotinic acid.—A mixture of 41.4 g. of 2-chloro-6-methylnicotinic acid and 520 ml. of 70% aqueous ethylamine was heated in a stainless steel autoclave for twenty hours at 100° C., the maximum pressure being about 200 lbs. per square inch. The reaction mixture was concentrated *in vacuo*. To the remaining brown oil was added 20.3 g. of sodium bicarbonate in 270 ml. of water and the mixture was concentrated *in vacuo*. The resulting residue was taken up in benzene and the solution concentrated *in vacuo* to remove the benzene; this benzene treatment was repeated twice. The residue was dissolved in hot benzene, the solution filtered, and the filtrate concentrated to yield 49 g. of crude product, 2-ethylamino-6-methylnicotinic acid, which was used in Example 3 without further purification. In another run, the crude product (from 10.89 of 2-chloro-6-methylnicotinic acid) was recrystallized once from benzene to yield the product as a ten-yellow solid (9.8 g.), m.p. 112–115° C. A sample for analysis, m.p. 116–118° C., was obtained by recrystallization from benzene-cyclohexane after treating the hot benzene solution with decolorizing charcoal and filtering off the charcoal.

Following the procedure described above in Example 2 but using in place of 2-chloro-6-methylnicotinic acid or in place of aqueous ethylamine a molar equivalent quantity of the appropriate 2-halo-6-(lower-alkyl)nicotinic acid or aqueous lower-alkylamine, respectively, there are obtained the following 2-(lower-alkylamino)-6-(lower-alkyl)nicotinic acids: 6-ethyl-2-ethylaminonicotinic acid using 2-chloro-6-ethylnicotinic acid, 2-ethylamino-6-isopropylnicotinic acid using 2-chloro-6-isopropylnicotinic acid; 6-n-butyl-2-ethylaminonicotinic acid using 2-chloro-6-n-butylnicotinic acid; 2-ethylamino-6-n-hexylnicotinic acid using 2-chloro-6-n-hexylnicotinic acid; 6-methyl-2-methylaminonicotinic acid using aqueous methylamine; 6-methyl-2-n-propylaminonicotinic acid using aqueous n-propylamine; 2-isobutylamino-6-methylnicotinic acid using aqueous isobutylamine; and 2-n-hexylamino-6-methylnicotinic acid using aqueous n-hexylamine.

Example 3

1-Ethyl-7-methyl-1H,4H-pyrido[2,3-d][1,3]oxazine-2,4-dione.—To a solution containing 49 g. of 2-ethylamino-6-methylnicotinic acid dissolved in 250 ml. of xylene, was added 400 ml. of ethyl chloroformate and the mixture was refluxed for twenty hours. The reaction mixture was concentrated *in vacuo,* the residue taken up in benzene and the benzene removed *in vacuo.* The benzene treatment was repeated. The residue was crystallized from benzene-cyclohexane to yield 29 g. of crystalline product, which had a faint odor of ethyl chloroformate. The product was triturated twice with ether:cyclohexane (1:1), the mixture filtered and the product dried *in vacuo* for two hours to yield 28.7 g. of 1-ethyl-7-methyl-1H,4H-pyrido[2,3-d][1,3]oxazine-2,4-dione, m.p. 116–117° C.

Alternatively, the above preparation can be carried out using phosgene in place of ethyl chloroformate.

Example 4

1-Ethyl-1,4-dihydro - 2,7 - dimethyl-4-oxo-1,8-naphthyridine-3-carboxylic acid.—To a cooled and stirred mixture containing 70 ml. of dry dimethylformamide and 4.4 g. of sodium hydride (60%) under an atmosphere of nitrogen was added with stirring 14 ml. of ethyl acetoacetate. After the foaming had subsided (about thirty minutes), to the stirred mixture was added 22.7 g. of 1-ethyl-7-methyl - 1H,4H - pyrido[2,3-d][1,3]oxazine-2,4-dione and the resulting stirred reaction mixture was slowly warmed up to 90° C. (on a steam bath) and kept there for six hours. The reaction mixture was then concentrated *in vacuo* to yield 37 g. of brown gummy residue containing ethyl 1-ethyl-1,4-dihydro-2,7-dimethyl-4-oxo-1,8-naphthyridine-3-carboxylate. The residue was dissolved in 250 ml. of 95% ethanol; 36.8 ml. of 35% aqueous sodium hydroxide solution was added; and the mixture was refluxed with stirring for two hours. The hot reaction mixture was filtered and the filtrate concentrated *in vacuo.* The residual solid was dissolved in 280 ml. of water, the solution filtered and the filtrate acidified with acetic acid plus some hydrochloric acid to a pH or 5. The acidic solution was cooled and the separated product was collected to yield 16.35 g. of tan-white crystals after drying *in vacuo* at 90° C. The crystals were recrystallized once from tetrahydrofuran-benzene and then twice from tetrahydrofuran to yield, as white crystals, 7.2 g. of 1-ethyl-1,4-dihydro-2,7-dimethyl-4-oxo-1,8-naphthyridine-3-carboxylic acid, m.p. 226–227° C.

Example 5

1-Ethyl-1,4-dihydro - 7 - methyl-4-oxo-1,8-naphthyridine-3-carboxylic acid is prepared following the procedure described in Example 4 but using in place of ethyl acetoacetate an equivalent molar quantity of ethyl formylacetate.

Following the procedure described in Example 3 but using in place of 2-ethylamino-6-methylnicotinic acid a molar equivalent quantity of the appropriate 2-(lower-alkylamino)-6-(lower-alkyl)nicotinic acid, the following 1-(lower-alkyl)-7-(lower-alkyl) - 1H,4H - pyrido[2,3-d][1,3]oxazine-2,4-diones of Examples 6–13 are prepared:

Example 6

1,7-Diethyl - 1H,4H - pyrido[2,3-d][1,3]oxazine-2,4-dione using 2-ethylamino-6-ethylnicotinic acid.

Example 7

1-Ethyl-7-isopropyl - 1H,4H - pyrido[2,3-d][1,3]oxazine-2,4-dione using 2 - ethylamino-6-isopropylnicotinic acid.

Example 8

7-n-Butyl-1-ethyl - 1H,4H - pyrido[2,3-d][1,3]oxazine-2,4-dione using 6-n-butyl-2-ethylaminonicotinic acid.

Example 9

1-Ethyl-7-n-hexyl - 1H,4H - pyrido[2,3d][1,3]oxazine using 2-ethylamino-6-n-hexylnicotinic acid.

Example 10

1,7-Dimethyl - 1H,4H - pyrido[2,3-d][1,3]oxazine-2,4-dione using 6-methyl-2-methylaminonicotinic acid.

Example 11

7-Methyl-1-n-propyl - 1H,4H - pyrido[2,3 - d][1,3]oxazine-2,4-dione using 6-methyl-2-n-propylaminonicotinic acid.

Example 12

1-Isobutyl-7-methyl - 1H,4H - pyrido[2,3-d][1,3]oxazine-2,4-dione using 2-isobutylamino-6-methylnicotinic acid.

Example 13

1-n-Hexyl-7-methyl - 1H,4H - pyrido[2,3-d][1,3]oxazine-2,4-dione using 2-n-hexylamino-6-methylnicotinic acid.

Following the procedure described in Example 4 but using in place of 1-ethyl-7-methyl-1H,4H-pyrido[2,3-d][1,3]oxazine-2,4-dione and/or ethyl acetoacetate molar equivalent quantities, respectively, of the appropriate 1-(lower - alkyl) - 7 - (lower-alkyl)-1H,4H-pyrido[2,3-][1,3]oxazine-2,4-dione and/or ethyl formylacetate, there are obtained the compounds of Examples 14–21:

Example 14

1,7-Diethyl-1,4-dihydro - 4 - oxo-1,8-naphthyridine-3-carboxylic acid using 1,7-diethyl-1H,4H-pyrido[2,3-d][1,3]oxazine-2,4-dione and ethyl formylacetate.

Example 15

1-Ethyl-7-isopropyl - 1,4 - dihydro-1,8-naphthyridine-3-carboxylic acid using 1-ethyl-7-isopropyl-1H,4H-pyrido[2,3-d][1,3]oxazine-2,4-dione and ethyl formylacetate.

Example 16

7-n-Butyl-1-ethyl - 1,4 - dihydro-2-methyl-4-oxo-1,8-naphthyridine-3-carboxylic acid using 7-n-butyl-1-ethyl-1H,4H-pyrido[2,3-d][1,3]oxazine-2,4-dione and ethyl acetoacetate.

Example 17

1-Ethyl-7-n-hexyl-1,4-dihydro - 2 - methyl-4-oxo-1,8-naphthyridine-3-carboxylic acid using 1-ethyl-7-n-hexyl-1H,4H-pyrido[2,3-d][1,3]oxazine-2,4-dione and ethyl acetoacetate.

Example 18

1,4-Dihydro-1,7-dimethyl - 4 - oxo-1,8-naphthyridine-3-carboxylic acid using 1,7-dimethyl-1H,4H-pyrido[2,3-d][1,3]oxazine-2,4-dione and ethyl formylacetate.

Example 19

1,4-Dihydro-7-methyl - 4 - oxo-1-n-propyl-4-oxo-1,8-naphthyridine-3-carboxylic acid using 7-methyl-1-n-propyl-1H,4H-pyrido[2,3-d][1,3]oxazine-2,4-dione and ethyl formylacetate.

Example 20

1,4-Dihydro-1-isobutyl - 2,7 - dimethyl - 4 - oxo-1,8-naphthyridine-3-carboxylic acid using 1-isobutyl-7-methyl-1H,4H-pyrido[2,3-d][1,3]oxazine-2,4-dione and ethyl acetoacetate.

Example 21

1,4-Dihydro-1-n-hexyl - 2,7 - dimethyl - 4 - oxo-1,8-naphthyridine-3-carboxylic acid using 1-n-hexyl-7-methyl-1H,4H-pyrido[2,3-d][1,3]oxazine - 2,4 - dione and ethyl acetoacetate.

Example 22

1,2 - Dihydro-2-oxo-6-(4-pyridyl)nicotinic acid.—To a solution containing 70 ml. of 97% sulfuric acid and 70 ml. of water was added 19.7 g. of 1,2-dihydro-2-oxo-6-(4-pyridyl)nicotinonitrile. The resulting solution was refluxed for ninety-six hours, allowed to cool and poured into 1,500 ml. of water. The solution was neutralized with 35% aqueous sodium hydroxide solution. The resulting precipitate was collected, dried, recrystallized from dimethylformamide (about 1,500 ml.), washed with ethanol and dried *in vacuo* at 60° C. to yield 6.45 g. of 1,2-dihydro-2-oxo-6-(4-pyridyl)nicotinic acid, m.p. >300° C. with decomposition. A small sample for analysis was recrystallized a second time from dimethylformamide.

Following the procedure described in Example 22 but using in place of 1,2-dihydro-2-oxo-6-(4-pyridyl)nicotinonitrile a molar equivalent quantity of the appropriate 1,2 - dihydro - 2 - oxo-6-Q'''-nicotinonitrile, there are obtained the corresponding 1,2-dihydro-2-oxo-6-Q'''-nicotinic acids of Examples 23–29:

Example 23

1,2 - Dihydro-2-oxo-6-(3-pyridyl)nicotinic acid using 1,2-dihydro-2-oxo-6-(3-pyridyl)nicotinonitrile, the latter prepared by reacting the sodium salt of nicotinoylacetaldehyde with cyanoacetamide.

Example 24

1,2-Dihydro-6-(2-methyl-4-pyridyl)-2-oxonicotinic acid using 1,2 - dihydro-6 - (2-methyl-4-pyridyl)-2-oxonicotinonitrile, the latter prepared by reacting the sodium salt of 2-methylisonicotinoylacetaldehyde with cyanoacetamide.

Example 25

1,2-Dihydro-6-(3-methyl-4-pyridyl)-2-oxonicotinic acid using 1,2 - dihydro-6 - (3-methyl-4-pyridyl)-2-oxonicotinonitrile, the latter prepared by reacting the sodium salt of 3-methylisonicotinoylacetaldehyde with cyanocetamide.

Example 26

6 - (2-Ethyl-4-pyridyl)-1,2-dihydro-2-oxonicotinic acid using 6-(2-ethyl-4-pyridyl) - 1,2-dihydro-2-oxonicotinonitrile, the latter prepared by reacting the sodium salt of 2-ethylisonicotinoylacetaldehyde with cyanoacetamide.

Example 27

6 - (3-Ethyl-4-pyridyl)-1,2-dihydro-2-oxonicotinic acid using 6-(3-ethyl-4-pyridyl) - 1,2-dihydro-2-oxonicotinonitrile, the latter prepared by reacting the sodium salt of 3-ethylisonicotinoylacetaldehyde with cyanoacetamide.

Example 28

1,2 - Dihydro-6-(2,6-dimethyl-4-pyridyl)-2-oxonicotinic acid using 1,2 - dihydro - 6 - (2,6-dimethyl-4-pyridyl)-2-oxonicotinonitrile, the latter prepared by reacting the sodium salt of 2,6-dimethylisonicotinoylacetaldehyde with cyanoacetamide.

Example 29

1,2 - Dihydro-6-(3,5-dimethyl-4-pyridyl)-2-oxonicotinic acid using 1,2 - dihydro - 6 - (3,5-dimethyl-4-pyridyl)-2-oxonicotinonitrile, the latter prepared by reacting the sodium salt of 3,5-dimethylisonicotinoylacetaldehyde with cyanoacetamide.

Following the procedure described in Example 1 but using in place of 1,2-dihydro-6-methyl-2-oxonicotinic acid a molar equivalent quantity of the appropriate 1,2-dihydro-2-oxo-6-Q'''-nicotinic acid, there are obtained the following 2-chloro-6-Q'''-nicotinic acids of Examples 30–37:

Example 30

2-Chloro-6-(3-pyridyl)nicotinic acid using 1,2-dihydro-2-oxo-6-(3-pyridyl)nicotinic acid.

Example 31

2 - Chloro-6-(2 - methyl-4-pyridyl)nicotinic acid using 1,2-dihydro-6-(2-methyl-4-pyridyl)-2-oxonicotinic acid.

Example 32

2 - Chloro-6 - (3-methyl-4-pyridyl)nicotinic acid using 1,2-dihydro-6-(3-methyl-4-pyridyl)-2-oxonicotinic acid.

Example 33

2-Chloro-6-(2-ethyl-4-pyridyl)nicotinic acid using 6-(2-ethyl-4-pyridyl)-1,2-dihydro-2-oxonicotinic acid.

Example 34

2-Chloro-6-(3-ethyl-4-pyridyl)nicotinic acid using 6-(3-ethyl-4-pyridyl)-1,2-dihydro-2-oxonicotinic acid.

Example 35

2-Chloro-6-(2,6-dimethyl-4-pyridyl)nicotinic acid using 1,2 - dihydro-6-(2,6-dimethyl-4-pyridyl) - 2 - oxonicotinic acid.

Example 36

2-Chloro-6-(4-pyridyl)nicotinic acid using 1,2-dihydro-2-oxo-6-(4-pyridyl)nicotinic acid.

Example 37

2-Chloro-6-(3,5-dimethyl-4-pyridyl)nicotinic acid using 1,2 - dihydro-6-(3,5-dimethyl-4-pyridyl) - 2 - oxonicotinic acid.

Following the procedure described in Example 2 but using in place of 2-chloro-6-methylnicotinic acid or in place of aqueous ethylamine a molar equivalent quantity of the appropriate 2-halo-6-Q'''-nicotinic acid or aqueous lower-alkylamine, respectively, there are obtained the following 2-(lower-alkylamino)-6-Q'''-nicotinic acids of Examples 38–48:

Example 38

2 - Ethylamino-6 - (3 - pyridyl)nicotinic acid using 2-chloro-6-(3-pyridyl)nicotinic acid and ethylamine.

Example 39

2 - Ethylamino-6-(2-methyl-4-pyridyl)nicotinic acid using 2-chloro-6-(2-methyl - 4 - pyridyl)nicotinic acid and ethylamine.

Example 40

2 - Ethylamino-6-(3-methyl-4-pyridyl)nicotinic acid using 2-chloro-6-(3-methyl - 4 - pyridyl)nicotinic acid and ethylamine.

Example 41

2-Ethylamino-6-(2-ethyl-4-pyridyl)nicotinic acid using 2-chloro-6 - (2-ethyl-4-pyridyl)nicotinic acid and ethylamine.

Example 42

2-Ethylamino-6-(3-ethyl-4-pyridyl)nicotinic acid using 2 - chloro-6-(3-ethyl-4-pyridyl)nicotinic acid and ethylamine.

Example 43

2 - Ethylamino-6-(2,6-dimethyl-4-pyridyl)nicotinic acid using 2 - chloro-6-(2,6-dimethyl-4-pyridyl)nicotinic acid and ethylamine.

Example 44

2 - Ethylamino-6-(3,5-dimethyl-4-pyridyl)nicotinic acid using 2 - chloro-6-(3,5-dimethyl-4-pyridyl)nicotinic acid and ethylamine.

Example 45

2 - Methylamino-6-(4 - pyridyl)nicotinic acid using 2-chloro-6-(4-pyridyl)nicotinic acid and methylamine.

Example 46

2-Isopropylamino-6-(2-methyl-4-pyridyl)nicotinic acid using 2-chloro-6-(2 - methyl-4-pyridyl)nicotinic acid and isopropylamine.

Example 47

2 - n - Butylamino-6-(4-pyridyl)nicotinic acid using 2-chloro-6-(4-pyridyl)nicotinic acid and n-butylamine.

Example 48

2 - n - Hexylamino - 6 - (4 - pyridyl)nicotinic acid using 2-chloro-6-(4-pyridyl)nicotinic acid and n-hexylamine.

Example 49

2 - Ethylamino - 6 - (4 - pyridyl)nicotinic acid using 2-chloro-6-(4-pyridyl)nicotinic acid and ethylamine.

Following the procedure described in Example 3 but using in place of 2-ethylamino-6-methylnicotinic acid a molar equivalent quantity of the appropriate 2-(lower-alkylamino)-6-Q'''-nicotinic acid, there are obtained the following 1 - (lower - alkyl) - 7-Q'''-1H,4H-pyrido[2,3-d][1,3]oxazine-2,4-diones of Examples 50–61:

Example 50

1 - Ethyl - 7 - (3 - pyridyl) - 1H,4H - pyrido[2,3-d][1,3]oxazine-2,4-dione using 2-ethylamino-6-(3-pyridyl)nicotinic acid.

Example 51

1 - Ethyl - 7 - (2 - methyl - 4 - pyridyl) - 1H,4H - pyrido[2,3-d][1,3]oxazine-2,4-dione using 2-ethylamino-6-(2-methyl-4-pyridyl)nicotinic acid.

Example 52

1 - Ethyl - 7 - (3 - methyl - 4 - pyridyl) - 1H,4H - pyrido[2,3-d][1,3]oxazine-2,4-dione using 2-ethylamino-6-(3-methyl-4-pyridyl)nicotinic acid.

Example 53

1 - Ethyl - 7 - (2 - ethyl - 4 - pyridyl) - 1H,4H - pyrido[2,3-d][1,3]oxazine-2,4-dione using 2-ethylamino-6-(2-ethyl-4-pyridyl)nicotinic acid.

Example 54

1 - Ethyl - 7 - (3 - ethyl - 4 - pyridyl) - 1H,4H - pyrido[2,3-d][1,3]oxazine-2,4-dione using 2-ethylamino-6-(3-ethyl-4-pyridyl)nicotinic acid.

Example 55

1 - Ethyl - 7 - (2,6 - dimethyl - 4 - pyridyl) - 1H,4H - pyrido[2,3-d][1,3]oxazine-2,4-dione using 2-ethylamino-6-(2,6-dimethyl-4-pyridyl)nicotinic acid.

Example 56

1 - Ethyl - 7 - (3,5 - dimethyl - 4 - pyridyl) - 1H,4H - pyrido[2,3-d][1,3]oxazine - 2,4-dione using 2-ethylamino-6-(3,5-dimethyl-4-pyridyl)nicotinic acid.

Example 57

1 - Methyl - 7 - (4 - pyridyl) - 1H,4H - pyrido[2,3-d][1,3]oxazine-2,4-dione using 2-methylamino-6-(4-pyridyl)nicotinic acid.

Example 58

1 - Isopropyl - 7 - (2 - methyl - 4 - pyridyl) - 1H,4H-pyrido[2,3-d][1,3]oxazine-2,4-dione using 2-isopropylamino-6-(2-methyl-4-pyridyl)nicotinic acid.

Example 59

1 - n - Butyl - 7 - (4 - pyridyl) - 1H,4H - pyridol[2,3-d][1,3]oxazine-2,4-dione using 2-n-butylamino-6-(4-pyridyl)nicotinic acid.

Example 60

1 - n - Hexyl - 7 - (4 - pyridyl) - 1H,4H - pyrido[2,3-d][1,3]oxazine - 2,4 - dione using 2-n-hexylamino-7-(4-pyridyl)nicotinic acid.

Example 61

1 - Ethyl - 7 - (4 - pyridyl) - 1H,4H - pyrido[2,3-d][1,3]oxazine-2,4-dione using 2-ethylamino-6-(4-pyridyl)nicotinic acid.

Following the procedure described in Example 4 but using in place of 1-ethyl-7-methyl-1H,4H-pyrido[2,3-d][1,3]oxazine-2,4-dione a molar equivalent quantity of the appropriate 1 - (lower-alkyl)-7-Q'''-1H,4H-pyrido[2,3-d][1,3]oxazine-2,4-dione and either ethyl acetoacetate or a molar equivalent quantity of ethyl formylacetate, there are obtained the 1-(lower-alkyl)-1,4-dihydro-2-methyl(or 2-unsubstituted)-4-oxo-7-Q'''-1,8 - naphthyridine - 3 - carboxylic acids of Examples 62–73:

Example 62

1 - Ethyl - 1,4 - dihydro - 4 - oxo - 7 - (3 - pyridyl)-1,8-naphthyridine-3-carboxylic acid using 1-ethyl-7-(3-pyridyl)-1H,4H - pyrido[2,3 - d][1,3]oxazine - 2,4 - dione and ethyl formylacetate.

Example 63

1 - Ethyl - 1,4 - dihydro - 7 - (2 - methyl - 4 - pyridyl)-4-oxo-1,8-naphthyridine-3-carboxylic acid using 1-ethyl-7 (2-methyl-4-pyridyl)-1H,4H-pyrido[2,3 - d][1,3]oxazine-2,4-dione and ethyl formylacetate.

Example 64

1 - Ethyl - 1,4 - dihydro - 2 - methyl - 7 - (3 - methyl - 4-pyridyl)-4-oxo-1,8-naphthyridine-3-carboxylic acid using 1 - ethyl - 7 - (3 - methyl - 4 - pyridyl) - 1H,4H - pyrido[2,3-d][1,3]oxazine - 2,4-dione and ethyl acetoacetate.

Example 65

1 - Ethyl - 7 - (2 - ethyl - 4 - pyridyl) - 1,4 - dihydro - 4-oxo-1,8-naphthyridine-3-carboxylic acid using 1-ethyl-7-(2 - ethyl - 4 - pyridyl) - 1H,4H - pyrido[2,3-d][1,3]oxazine-2,4-dione and ethyl formylacetate.

Example 66

1 - Ethyl - 7 - (3 - ethyl - 4 - pyridyl) - 1,4 - dihydro - 2-methyl-4-oxo-1,8-naphthyridine-3-carboxylic acid using 1-ethyl - 7 - (3 - ethyl - 4 - pyridyl) - 1H,4H - pyrido[2,3-d][1,3]oxazine-2,4-dione and ethyl acetoacetate.

Example 67

1 - Ethyl - 1,4 - dihydro - 7 - (2,6 - dimethyl - 4 - pyridyl)-4-oxo-1,8-naphthyridine-3-carboxylic acid using 1-ethyl - 7 - (2,6 - dimethyl - 4 - pyridyl) - 1H,4H - pyrido[2,3-d][1,3]oxazine-2,4-dione and ethyl formylacetate.

Example 68

1 - Ethyl - 1,4 - dihydro - 2 - methyl - 7 - (3,5 - dimethyl-4-pyridyl)-4-oxo-1,8-naphthyridine - 3 - carboxylic acid using 1 - ethyl - 7-(3,5-dimethyl-4-pyridyl)-1H,4H-pyrido[2,3-d][1,3]oxazine-2,4-dione and ethyl acetoacetate.

Example 69

1,4 - Dihydro - 1 - methyl - 4 - oxo - 7 - (4 - pyridyl)-1,8-naphthyridine-3-carboxylic acid using 1-methyl-7-(4-pyridyl)-1H,4H-pyrido[2,3-d][1,3]oxazine-2,4-dione and ethyl formylacetate.

Example 70

1,4 - Dihydro - 1 - isopropyl - 7 - (2 - methyl - 4 - pyridyl)-4-oxo-1,8-naphthyridine-3-carboxylic acid using 1-isopropyl - 7 - (2 - methyl - 4 - pyridyl) - 1H,4H - pyrido[2,3-d][1,3]oxazine-2,4-dione and ethyl formylacetate.

Example 71

1 - n - Butyl - 1,4 - dihydro - 2 - methyl - 4 - oxo - 7 - (4-pyridyl)-1,8-naphthyridine-3-carboxylic acid using 1-n-butyl - 7 - (4 - pyridyl) - 1H,4H - pyrido[2,3-d][1,3]oxazine-2,4-dione and ethyl acetoacetate.

Example 72

1 - n - Hexyl - 1,4 - dihydro - 2 - methyl - 4 - oxo - 7 - (4-pyridyl)-1,8-naphthyridine-3-carboxylic acid using 1-n-hexyl - 7 - (4 - pyridyl) - 1H,4H - pyrido[2,3-d][1,3]oxazine-2,4-dione and ethyl acetoacetate.

Example 73

1 - Ethyl - 1,4 - dihydro - 4-oxo - 7 - (4 - pyridyl) - 1,8-naphthyridine-3-carboxylic acid using 1-ethyl-7-(4-pyridyl) - 1H,4H - pyrido[2,3-d][1,3]oxazine-2,4-dione and ethyl formylacetate.

Example 74

1 - Ethyl - 7 - methyl - 1H,4H - pyrido[2,3-d][1,3]oxazine-2,4-dione-8-oxide.—A mixture containing 20.6 g. of 1-ethyl - 7 - methyl - 1H,4H - pyrido[2,3 - d][1,3]oxazine-2,4-dione, 25 ml. of peracetic acid and 250 ml. of acetic acid is heated with stirring for about four hours on a steam bath. The reaction mixture is concentrated *in vacuo* until a solid starts to separate. The hot mixture is filtered and the filtrate allowed to cool. The resulting precipitate is collected, washed with ethanol, dried, recrystallized from isopropyl alcohol and dried *in vacuo* at 70° C. to yield 1 - ethyl - 7 - methyl - 1H,4H - pyrido[2,3-d][1,3]oxazine-2,4-dione-8-oxide.

Example 75

7 - Acetoxymethyl - 1 - ethyl - 1H,4H - pyrido[2,3-d][1,3]oxazine-2,4-dione.—A mixture containing 10.2 g. of 1 - ethyl - 7 - methyl - 1H,4H - pyrido[2,3 - d][1,3]oxazine-2,4-dione-8-oxide, 5.5 g. of acetic anhydride and 35 ml. of acetic acid is heated with stirring on a steam bath for fifty minutes and then evaporated *in vacuo* to dryness. The residue is crystallized from ethanol using decolorizing charcoal and dried *in vacuo* at 70° C. to yield 7-acetoxymethyl - 1 - ethyl - 1H,4H - pyrido[2,3 - d][1,3]oxazine-2,4-dione.

Following the procedure described in Example 74 but using in place of 1-ethyl-7-methyl-1H,4H-pyrido[2,3-d][1,3]oxazine-2,4-dione a molar equivalent quantity of the appropriate 1-(lower-alkyl) - 7 - methyl-1H,4H-pyrido[2,3-d][1,3]oxazine - 2,4 - dione, there are obtained the corresponding 1-(lower-alkyl) - 7 - methyl-1H,4H-pyrido[2,3-d][1,3]oxazine-2,4-dione-8-oxides of Examples 76–79:

Example 76

1,7-Dimethyl - 1H,4H - pyrido[2,3-d][1,3]oxazine-2,4-dione - 8 - oxide using 1,7-dimethyl-1H,4H-pyrido[2,3-d][1,3]oxazine-2,4-dione.

Example 77

7-Methyl-1-n-propyl - 1H,4H - pyrido[2,3-d][1,3]oxazine-2,4 - dione - 8 - oxide using 7-methyl-1-n-propyl-1H,4H-pyrido[2,3-d][1,3]oxazine-2,4-dione.

Example 78

1-Isobutyl - 7 - methyl-1H,4H-pyrido[2,3-d][1,3]oxazine - 2,4 - dione-8-oxide using 1-isobutyl - 7 - methyl-1H,4H-pyrido[2,3-d][1,3]oxazine-2,4-dione.

Example 79

1-n-Hexyl - 7 - methyl-1H,4H-pyrido[2,3-d][1,3]oxazine-2,4-dione - 8 - oxide using 1-isobutyl-7-methyl-1H,4H-pyrido[2,3-d][1,3]oxazine-2,4-dione.

Following the procedure described in Example 75 but using in place of 1-ethyl-7-methyl-1H,4H-pyrido[2,3-d][1,3]oxazine-2,4-dione-8-oxide and/or acetic anhydride molar equivalent quantities of the appropriate 1-(lower-alkyl) - 7 - methyl-1H,4H-pyrido[2,3-d][1,3]oxazine-2,4-dione-8-oxide and/or lower-alkanoic acid anhydride, respectively, there are obtained the 7-(lower-alkanoyloxymethyl) - 1 - (lower-alkyl)-1H,4H-pyrido[2,3-d][1,3]oxazine-2,4-diones of Examples 80–86:

Example 80

7-Acetoxymethyl - 1 - methyl-1H,4H-pyrido[2,3-d][1,3]oxazine-2,4-dione using 1,7-dimethyl - 1H,4H - pyrido[2,3-d][1,3]oxazine-2,4-dione-8-oxide and acetic anhydride.

Example 81

7-Acetoxymethyl-1-n-propyl - 1H,4H - pyrido[2,3-d][1,3]oxazine-2,4-dione using 7-methyl1-n-propyl-1H,4H-pyrido[2,3-d][1,3]oxazine - 2,4 - dione-8-oxide and acetic anhydride.

Example 82

7-Acetoxymethyl - 1 - isobutyl-1H,4H-pyrido[2,3-d][1,3] oxazine-2,4-dione using 1-isobutyl - 7 - methyl-1H,4H - pyrido[2,3-d][1,3]oxazine - 2,4 - dione-8-oxide and acetic anhydride.

Example 83

7 - Acetoxymethyl-1-n-hexyl-1H,4H-pyrido[2,3-d][1,3]oxazine-2,4-dione using 1-n-hexyl-7-methyl-1H,4H-pyrido[2,3-d][1,3]oxazine-2,4-dione-8-oxide and acetic anhydride.

Example 84

1-Ethyl - 7 - propionoxymethyl-1H,4H-pyrido[2,3-d][1,3]oxazine - 2,4 - dione using 1-ethyl-7-methyl-1H,4H-pyrido[2,3-d][1,3]oxazine - 2,4 - dione-8-oxide and propionic anhydride.

Example 85

1-Ethyl - 7 - isobutyroxymethyl-1H,4H-pyrido[2,3-d][1,3]oxazine-2,4-dione using 1-ethyl - 7 - methyl-1H,4H-pyrido[2,3-d][1,3]oxazine-2,4-dione-8-oxide and isobutyric anhydride.

Example 86

1-Ethyl - 7 - hexanoyloxymethyl-1H,4H-pyrido[2,3-d][1,3]oxazine-2,4-dione using 1-ethyl - 7 - methyl-1H,4H-pyrido[2,3-d][1,3]oxazine-2,4-dione-8-oxide and hexanoic acid anhydride.

Following the procedure described in Example 4 but using in place of 1-ethyl-7-methyl-1H,4H-pyrido[2,3-d][1,3]oxazine-2,4-dione a molar equivalent quantity of the appropriate 1-(lower-alkyl)-7-(lower-alkanoyloxymethyl) - 1 - (lower-alkyl) - 1H,4H - pyrido[2,3-d][1,3]oxazine-2,4-dione and either ethyl acetoacetate or a molar equivalent quantity of ethyl formylacetate, there are obtained the corresponding 1-(lower-alkyl)-1,4-dihydro-7-hydroxymethyl - 2 - methyl(or unsubstituted)-4-oxo-1,8-naphthyridine - 3 - carboxylic acids of Examples 87–94 after alkaline hydrolysis as in Example 4 of the corresponding ethyl 7-(lower-alkanoyloxy) - 1 - (lower-alkyl) - 1,4-dihydro-2-methyl(or unsubstituted)-4-oxo-1,8-naphthyridine-3-carboxylates first formed.

Example 87

1 - Ethyl - 1,4 - dihydro-7-hydroxymethyl-4-oxo-1,8-naphthyridine-3-carboxylic acid using 7-acetoxymethyl-1-ethyl - 1H,4H - pyrido[2,3-d][1,3]oxazine-2,4-dione and ethyl formylacetate, and hydrolyzing the resulting ethyl 7-acetoxy-methyl - 1 - ethyl-1,4-dihydro-4-oxo-1,8-naphthyridine-3-carboxylate.

Example 88

1,4-Dihydro - 7 - hydroxymethyl-1-methyl-4-oxo-1,8-naphthyridine - 3 - carboxylic acid using 7-acetoxymethyl-1-methyl - 1H,4H - pyrido[2,3-d][1,3]oxazine-2,4-dione and ethyl formylacetate, and hydrolyzing the resulting ethyl 7-acetoxymethyl - 1,4 - dihydro-4-oxo-1-n-propyl-1,8-naphthyridine-3-carboxylate.

Example 89

1,4-Dihydro - 7 - hydroxymethyl-1-isobutyl-2-methyl-4-oxo - 1,8 - naphthyridine-3-carboxylic acid using 7-acetoxymethyl - 1 - isobutyl-1H,4H-pyrido[2,3-d][1,3]oxazine-2,4-dione and ethyl acetoacetate, and hydrolyzing the resulting ethyl 7-acetoxymethyl-1,4-dihydro-1-isobutyl-2-methyl-4-oxo-1,8-naphthyridine-3-carboxylate.

Example 90

1-n-Hexyl - 1,4 - dihydro-7-hydroxymethyl-2-methyl-4-oxo-1,8-naphthyridine-3-carboxylic acid using 7-acetoxymethyl-1-n-hexyl-1H,4H-pyrido[2,3-d][1,3]oxazine - 2,4-dione and ethyl acetoacetate, and hydrolyzing the resulting ethyl 7-acetoxymethyl-1-n-hexyl-1,4-dihydro-2-methyl-4-oxo-1,8-naphthyridine-3-carboxylate.

Example 91

1 - Ethyl - 1,4 - dihydro-7-hydroxymethyl-4-oxo-1,8-naphthyridine - 3 - carboxylic acid using 1-ethyl-7-propionoxymethyl - 1H,4H - pyrido[2,3-d][1,3]oxazine-2,4-dione and ethyl formylacetate, and hydrolyzing the resulting ethyl 1-ethyl-1,4-dihydro-4-oxo - 7 - propionoxymethyl-1,8-naphthyridine-3-carboxylate.

Example 92

1 - Ethyl - 1,4 - dihydro-7-hydroxymethyl-4-oxo-1,8-naphthyridine - 3 - carboxylic acid using 1-ethyl-7-isobutyroxymethyl - 1H,4H - pyrido[2,3-d][1,3]oxazine-2,4-dione and ethyl formylacetate, and hydrolyzing the resulting ethyl 1-ethyl-1,4-dihydro-7-isobutyroxymethyl-4-oxo-1,8-naphthyridine-3-carboxylate.

Example 93

1-Ethyl-1,4-dihydro-7-hydroxymethyl-2-methyl-4 - oxo-1,8-naphthyridine-3-carboxylic acid using 1-ethyl-7-hexanoyloxymethyl-1H,4H-pyrido[2,3 - d][1,3]oxazine - 2,4-dione and ethyl acetoacetate, and hydrolyzing the resulting ethyl 1-ethyl-7-hexanoyloxymethyl - 1,4 - dihydro-2-methyl-4-oxo-1,8-naphthyridine-3-carboxylate.

We claim:

1. 1-(Lower-alkyl) - 7 - Q-1H,4H-pyrido[2,3-d][1,3]oxazine-2,4-dione where Q is lower-alkyl, lower-alkanoyloxymethyl, 4(or 3)-pyridyl or 4(or 3)-pyridyl having one or two non-tertiary lower-alkyl substituents, where lower-alkyl in each case has from one to six carbon atoms.

2. 1-Ethyl - 7 - methyl - 1H,4H - pyrido[2,3-d][1,3]oxazine-2,4-dione according to Claim 1 where 1-(lower-alkyl) is 1-ethyl and Q is methyl.

3. The process which comprises reacting 1-R₁-7-Q-1H, 4H-pyrido[2,3-d][1,3]oxazine - 2,4 - dione with a compound of the formula,

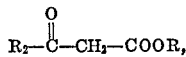

to produce a lower-alkyl 1-R₁-1,4-dihydro-2-R₂-7 - Q - 4-oxo-1,8-naphthyridine-3-carboxylate of the formula

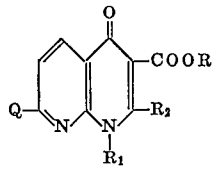

where R and R₁ are each lower-alkyl, R₂ is hydrogen or methyl, and Q is lower-alkyl, lower-alkanoyloxymethyl, 4-(or 3)-pyridyl or 4(or 3)-pyridyl having one or two non-tertiary lower-alkyl substituents, and hydrolyzing said lower-alkyl 1,8-naphthyridine - 3 - carboxylate to produce the corresponding 1 - R₁-1,4-dihydro-2-R₂-7-Q′-4-oxo-1,8-naphthyridine-3-carboxylic acid where R₁ and R₂ are defined as above and Q′ is lower-alkyl, hydroxymethyl, 4-(or 3)-pyridyl or 4(or 3)-pyridyl having one or two non-tertiary lower-alkyl substituents, where lower-alkyl in each case has from one to six carbon atoms.

4. The process according to Claim 3 where Q is methyl, R and R₁ are ethyl, and R₂ is hydrogen.

5. The process for producing 1-(lower-alkyl)-7-Q″-1H, 4H-pyrido[2,3-d][1,3]oxazine-2,4-dione which comprises heating 2-(lower-alkylamino)-6-Q″-nicotinic acid with a lower-alkyl chloroformate or phosgene, where Q″ is lower-alkyl, 4(or 3)-pyridyl or 4(or 3)-pyridyl having one or two non-tertiary lower-alkyl substituents, where lower-alkyl in each case has from one to six carbon atoms.

6. The process which comprises reacting from ambient to steam bath temperature 1 - R₁-7-methyl-1H,4H-pyrido-[2,3-d][1,3]oxazine-2,3-dione with an oxidizing agent capable of selectively converting pyridines to pyridine-N-oxides to produce the corresponding 1-R₁-7-methyl-1H, 4H - pyrido[2,3-d][1,3]oxazine-2,3-dione-8-oxide and reacting said 8-oxide with a lower-alkanoic acid anhydride to produce 1-R₁ - 7 - (lower-alkanoyloxymethyl)-1H,4H-pyrido[2,3-d][1,3]oxazine-2,3-dione.

7. The process which comprises reacting 1-R₁-7-Q-1H, 4H-pyrido[2,3-d][1,3]oxazine - 2,4 - dione with a compound of the formula,

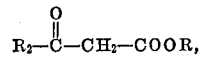

to produce a lower-alkyl 1-R₁ - 1,4 - dihydro-2-R₂-7-Q-4-oxo-1,8-naphthyridine-3-carboxylate of the formula

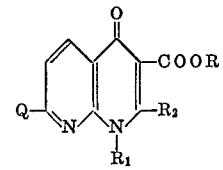

where R and R₁ are each lower-alkyl, R₂ is hydrogen or methyl, and Q is lower-alkyl, lower-alkanoyloxymethyl, 4(or 3)-pyridyl or 4(or 3)-pyridyl having one or two non-tertiary lower-alkyl substituents where lower-alkyl in each case has from one to six carbon atoms.

8. The process according to Claim 7 where Q is methyl, R and R₁ are ethyl, and R₂ is hydrogen.

9. The process according to Claim 5 where Q″ is methyl.

References Cited
UNITED STATES PATENTS 3,590,036　6/1971　Lesher et al. ____ 260—295.5 B
3,673,193　3/1972　Lesher et al. ____ 260—295.5 B ALAN L. ROTMAN, Primary Examiner U.S. Cl. X.R.

260—295.5 B; 424—266

UNITED STATES PATENT AND TRADEMARK OFFICE
CERTIFICATE OF CORRECTION

PATENT NO. : 3,838,120
DATED : September 24, 1974
INVENTOR(S) : Andrew W. Zalay and Malcolm R. Bell It is certified that error appears in the above-identified patent and that said Letters Patent are hereby corrected as shown below:

Column 3, line 7, "346,180" should read -- 346,190 --.

Column 4, line 30, "VI" should read -- VI' --.

Column 5, line 6, "oxzine" should read -- oxazine --.

Signed and Sealed this

Sixteenth Day of November 1976

[SEAL]

Attest:

RUTH C. MASON
Attesting Officer

C. MARSHALL DANN
Commissioner of Patents and Trademarks